United States Patent [19]

Tsutsui et al.

[11] Patent Number: 5,602,910
[45] Date of Patent: Feb. 11, 1997

[54] CONTROL APPARATUS FOR SWITCHING STATION CONNECTIONS USING A HOLDING TONE

[75] Inventors: Yuichiro Tsutsui; Minoru Ogata, both of Yokohama; Shoji Suzuki, Atsugi; Shinji Tsuchida, Zama; Shunji Arai, Yokohama; Shigeru Hiroki, Hiratsuka, all of Japan

[73] Assignee: Canon Kabushiki Kaisha, Tokyo, Japan

[21] Appl. No.: 270,311

[22] Filed: Jul. 5, 1994

Related U.S. Application Data

[63] Continuation of Ser. No. 801,894, Dec. 3, 1991, abandoned.

[30] Foreign Application Priority Data

| Dec. 4, 1990 | [JP] | Japan | 2-400382 |
| Dec. 4, 1990 | [JP] | Japan | 2-400383 |
| Dec. 4, 1990 | [JP] | Japan | 2-400388 |
| Dec. 4, 1990 | [JP] | Japan | 2-400389 |

[51] Int. Cl.$^6$ .................................. H04M 3/58
[52] U.S. Cl. .................. 379/212; 379/201; 379/393; 379/266
[58] Field of Search ............... 379/265, 266, 379/201, 210, 211, 212, 233, 214, 393, 162; 370/110.1, 156

[56] References Cited

U.S. PATENT DOCUMENTS

| 3,936,615 | 2/1976 | Pommerening | 379/212 |
| 4,125,748 | 11/1978 | Nahabedian et al. | 379/212 |
| 4,723,273 | 2/1988 | Diesel et al. | 379/211 |
| 4,809,321 | 2/1989 | Morganstein | 379/211 |
| 4,953,204 | 8/1990 | Cuschleg, Jr. et al. | 379/266 |
| 5,020,095 | 5/1991 | Morganstein et al. | 379/214 |
| 5,155,761 | 10/1992 | Hammond | 379/266 |

FOREIGN PATENT DOCUMENTS

| 0295470 | 12/1988 | European Pat. Off. . |
| 9000844 | 1/1990 | WIPO . |

*Primary Examiner*—Ahmad F. Matar
*Attorney, Agent, or Firm*—Fitzpatrick, Cella, Harper & Scinto

[57] ABSTRACT

In a call transfer apparatus wherein a request to transfer a call between first and second communication partners from the second communication partner to a transfer destination is made, a discriminating circuit discriminates whether the transfer destination can respond. A control unit places the first communication partner in a holding state while it is determined whether the transfer destination can respond. If the transfer destination can respond, the call is transferred. If speech communication with the transfer destination is not possible, the control unit releases the holding state of the first communication partner.

17 Claims, 14 Drawing Sheets

FIG. 10A

| T | R | A | N | S | F | E | R | | I | M | P | O | S | S | I | B | L | E | | | | |

| S | L | A | V | E | | T | E | L | | P | O | W | E | R | | O | F | F | ? | | | |

FIG. 10B

| C | A | L | L | I | N | G | | S | L | A | V | E | | T | E | L | | | | | | |

FIG. 10C

| S | L | A | V | E | | T | E | L | | B | U | S | Y | | | | | | | | | |

FIG. 10D

| T | R | A | N | S | F | E | R | | S | T | A | R | T | | | | | | | | | |

{ }

CONTROL APPARATUS FOR SWITCHING STATION CONNECTIONS USING A HOLDING TONE

This application is a continuation of application Ser. No. 07/801,894 filed Dec. 3, 1991, now abandoned.

BACKGROUND OF THE INVENTION

1. Field of the Invention

The invention relates to a speech control apparatus for executing calling of a terminal, holding of a call, and transfer.

2. Related Background Art

In conventional private branch exchanges (PBX) and key telephone apparatuses, there are private branch exchanges and key telephone apparatus which provide a transfer service. Even in a cordless telephone apparatus, a signal can be transferred between the master telephone and the slave telephone.

In the above conventional apparatus, however, in the case where, even when the operator tries to transfer, non-operating telephone numbers are input because the operator erroneously inputs the number of the transfer destination, or in the case where the transfer destination fails or a power source is turned off or wiring is disconnected, or in the case where the line is busy or the like, a busy tone is sent. The operator consequently must execute an operation to stop the transfer. Therefore, there are cases where not only the operation is troublesome but also the holding call is disconnected by an erroneous operation. The above problems also similarly occur in the cases where the transfer destination is a cordless telephone and where the transfer destination is out of the range of a radio call signal.

SUMMARY OF THE INVENTION

It is an object of the invention to reduce the processes of the operator in the case where a signal cannot be transferred.

Another object of the invention is to eliminate an operation for the operator to release the holding state in the case where a signal cannot be transferred.

Still another object of the invention is to inform the operator of the reasons why a signal cannot be transferred.

Further another object of the invention is to reduce the processes of the operator in the case where a radio terminal of the transfer destination is out of the range of a radio wave.

Further another object of the invention is to simplify the operation of the operator to stop the transfer to the specified transfer destination.

The above and other objects and features of the present invention will become apparent from the following detailed description and the appended claims with reference to the accompanying drawings.

BRIEF DESCRIPTION OF THE DRAWINGS

FIGS. 10A to 10D are diagrams of a display unit of the first embodiment;

DETAILED DESCRIPTION OF THE PREFERRED EMBODIMENTS

Figure 1:
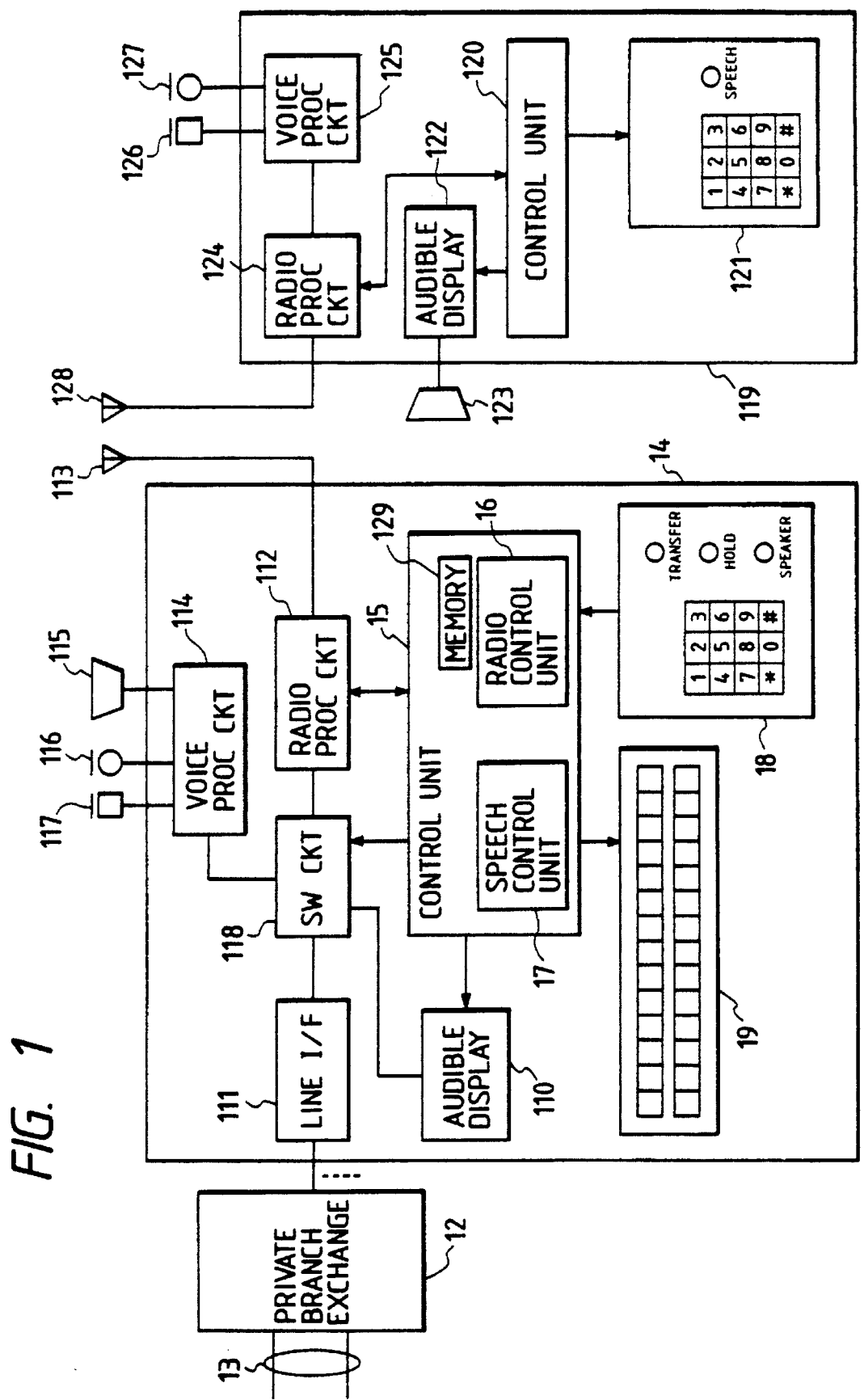
FIG. 1 is a constructional diagram of a fixed apparatus and a moving apparatus of the first embodiment.
Figure 2:
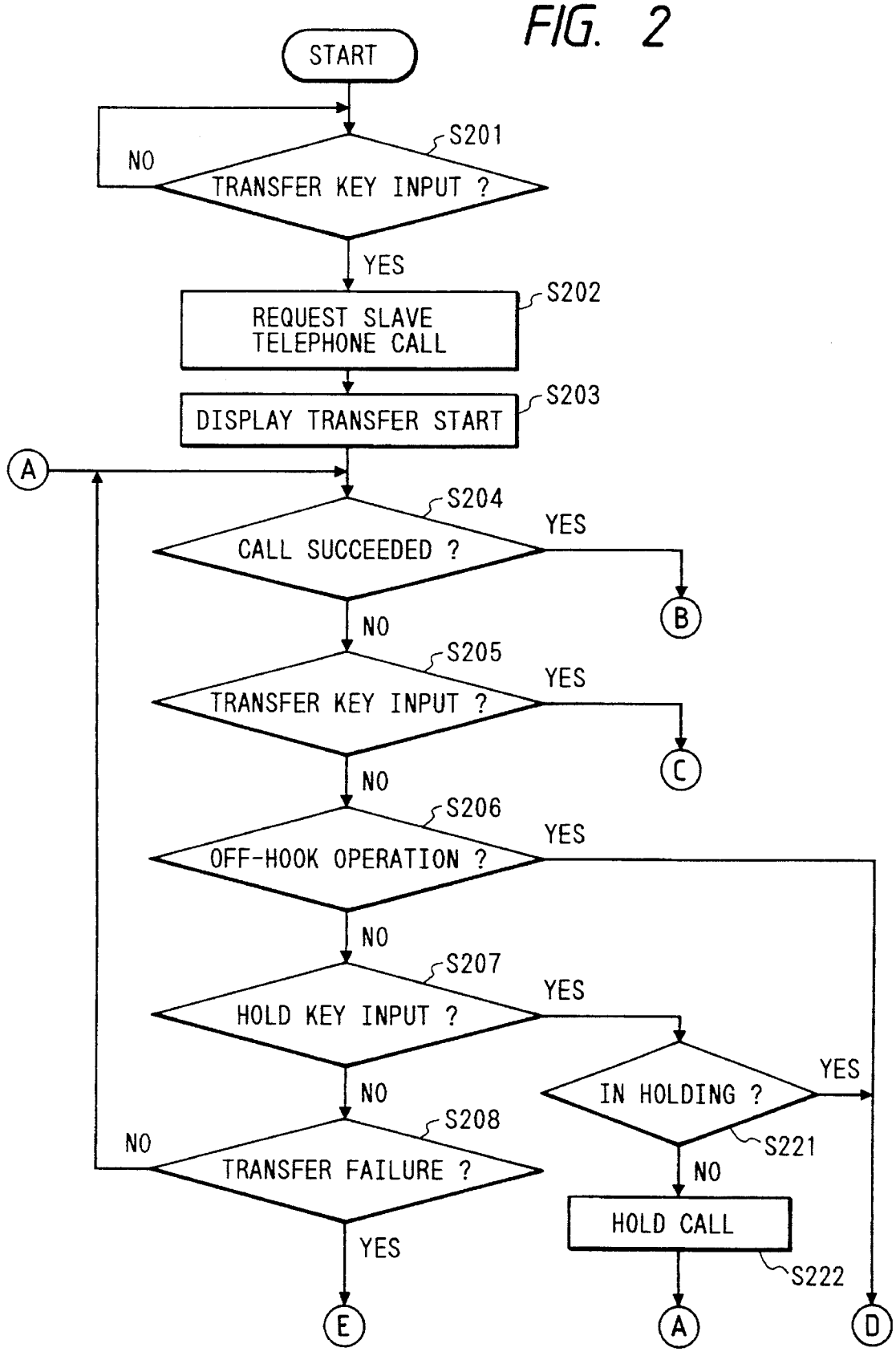
FIG. 2 is a flowchart for the first transferring process of the fixed apparatus in the first embodiment.
Figure 3:
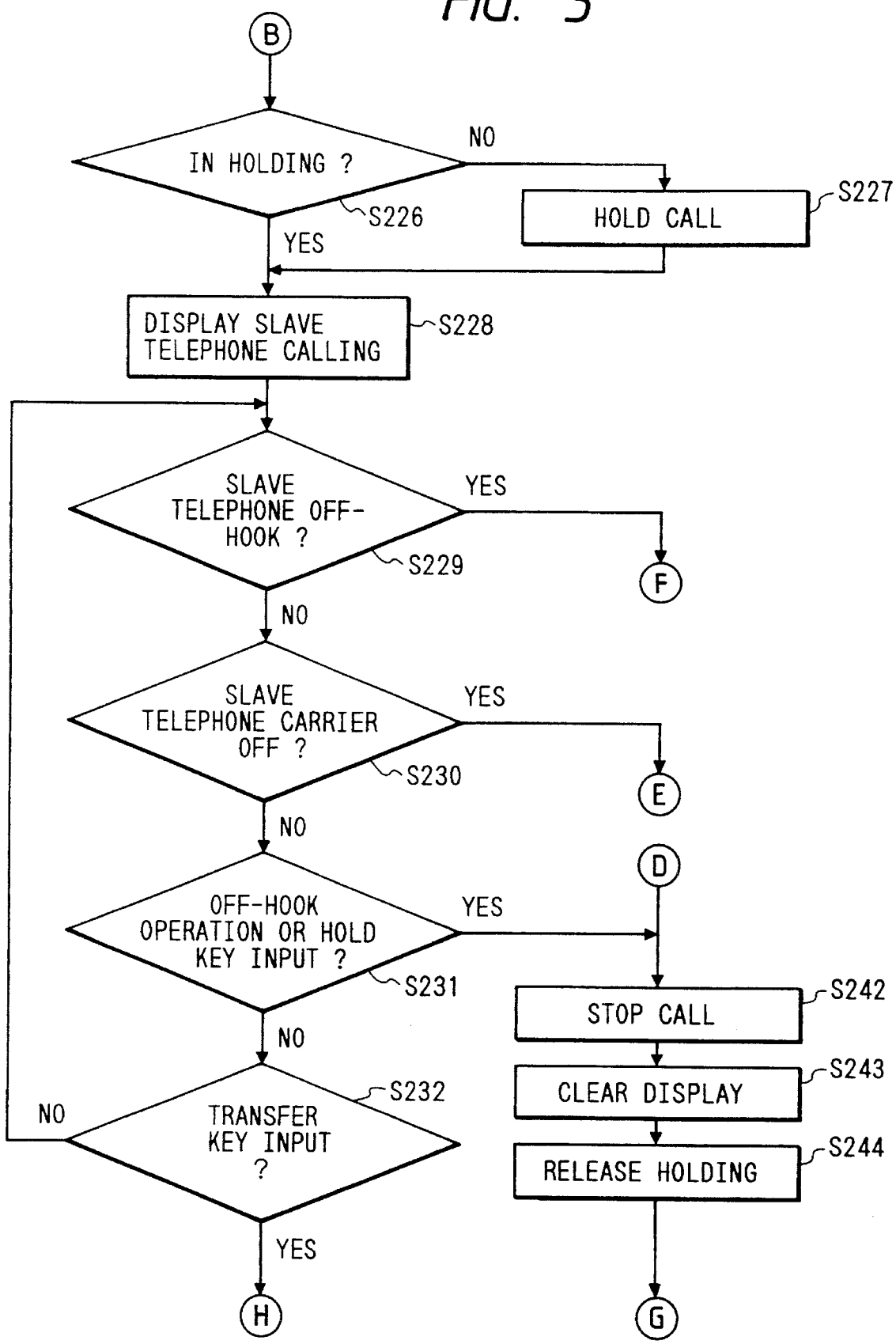
FIG. 3 is a flowchart for the second transferring process of the fixed apparatus of the first embodiment.
Figure 4:
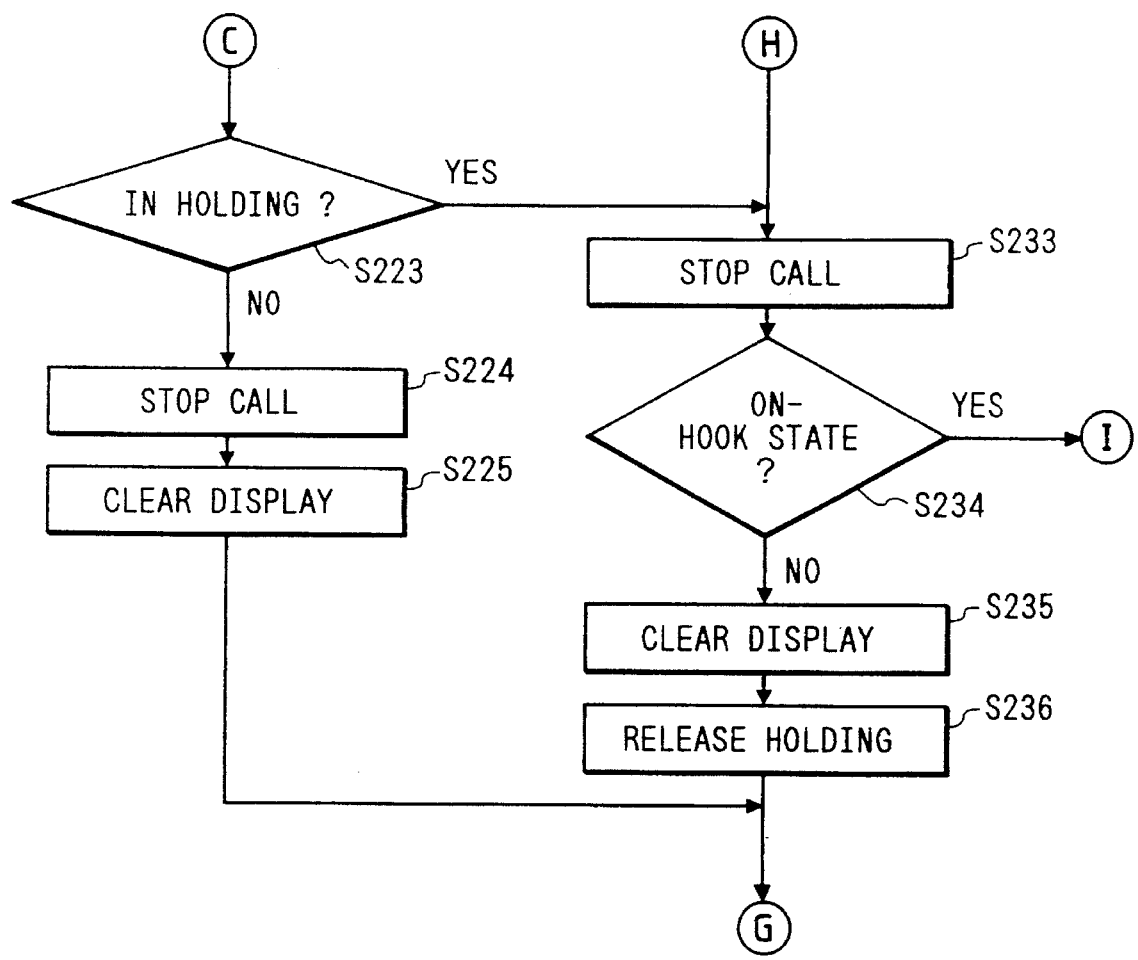
FIG. 4 is a flowchart for the third transferring process of the fixed apparatus of the first embodiment.
Figure 5:
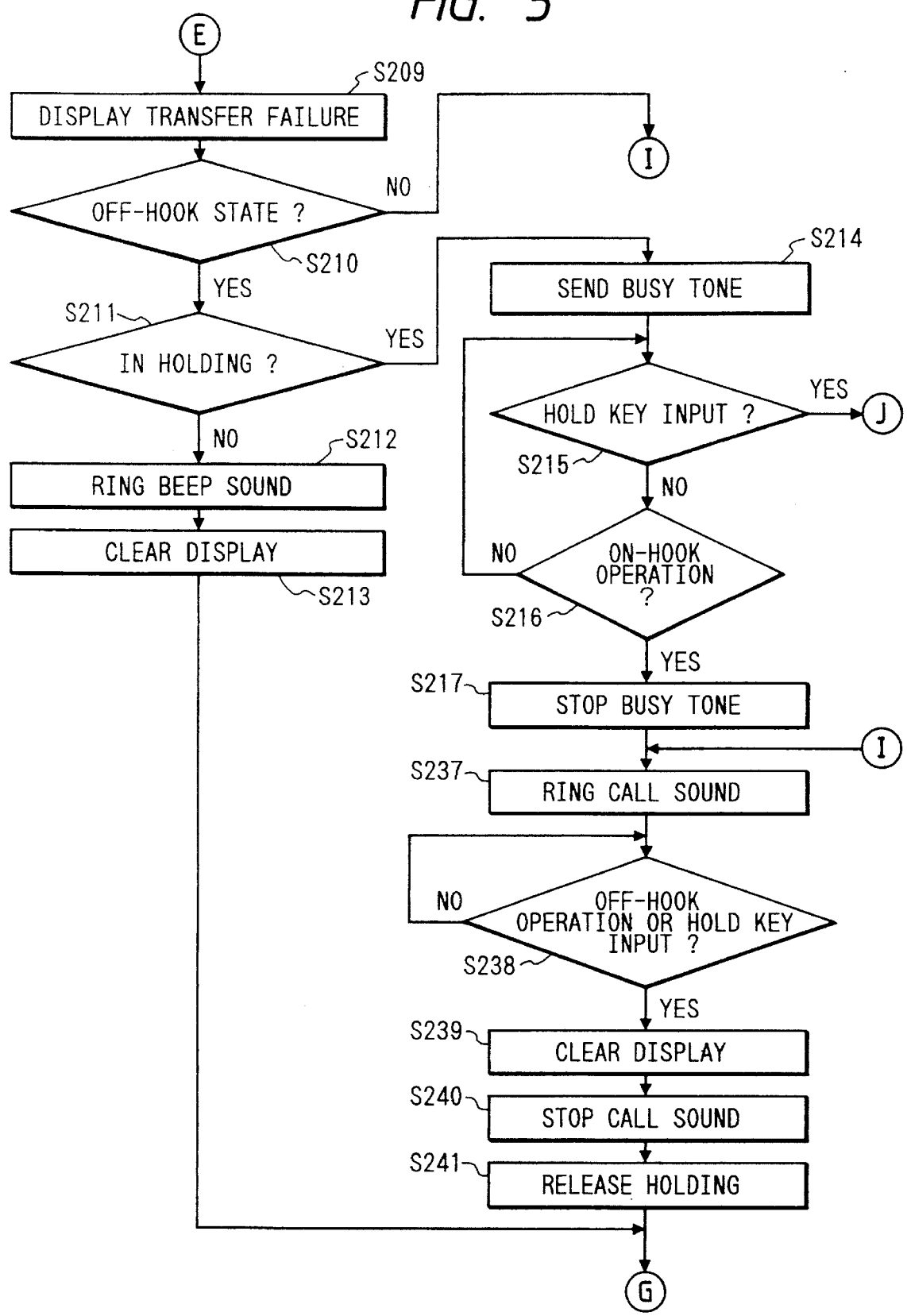
FIG. 5 is a flowchart for the fourth transferring process of the fixed apparatus of the first embodiment.
Figure 6:
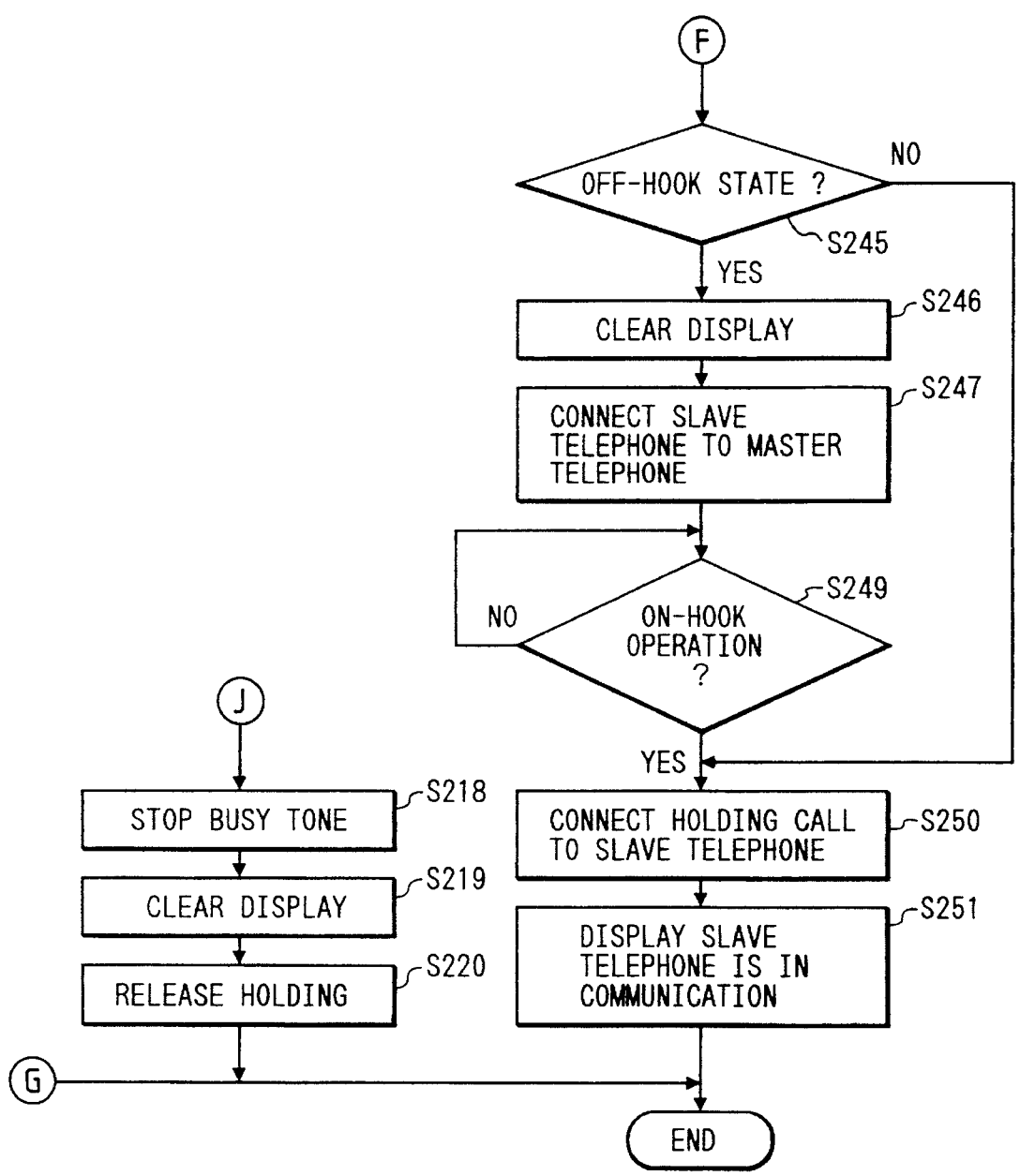
FIG. 6 is a flowchart for the fifth transferring process of the fixed apparatus of the first embodiment.

FIG. 1 shows a constructional diagram of a fixed apparatus and a slave telephone 119 in an embodiment of the invention. The fixed apparatus comprises a private branch exchange 12 and a master telephone 14 which is enclosed in the private branch exchange 12. Reference numeral 12 denotes the private branch exchange; 13 station lines which are enclosed in the private branch exchange; 14 the master telephone; 15 a control unit which has a memory (ROM, RAM) 129 therein and controls each section in the master telephone; 16 a radio control unit which is included in the control unit 15 and controls a communication protocol of each section mainly regarding the radio; and 17 a speech control unit which is included in the control unit 15 and controls each section other than the portions regarding the radio, display keys, a voice processing circuit, and the like and executes application processes regarding various kinds of speeches.

Reference numeral 18 denotes a key pad comprising a dial key, a transfer key, a holding key, a speaker key, a hook switch, and the like; 19 a display consisting of display elements of fourteen digits and two stages; 110 an audible display to generate a busy tone, a dial tone, a holding sound, and the like; 111 a line interface to interface with a wire communication line; 112 a radio processing circuit to execute processes for transmitting a voice signal and a control signal as a radio signal or for receiving a radio signal and separating into a voice signal and the control signal; 113 an antenna; 114 a voice processing circuit to execute a voice process through a transmitter 116, a receiver 117, a speaker 115, or the like; 115 the speaker; 116 the transmitter of a handset; 117 the receiver of the handset; and 118 a switching circuit for connecting and disconnecting speech channels among the line interface 111, audible display 110, radio processing circuit 112, and audio processing circuit 114.

The master telephone is constructed as mentioned above. The speech control unit 17 and radio control unit 16 may also exist as programs in a memory 129 in the control unit 15 in a software manner.

Reference numeral 119 denotes the slave telephone; 120 a control unit to control each section of the slave telephone 119; 121 a key pad comprising the dial key, speech key, and the like; 122 an audible display to generate a calling sound or the like; 123 a speaker; 124 a radio processing circuit to execute processes for transmitting a voice signal and a control signal as a radio signal or for receiving a radio signal and separating into a voice signal and a control signal; 125 a voice processing circuit to execute a voice process through a transmitter 126, a receiver 127, or the like; 126 the receiver of a handset; 127 the transmitter of the handset; and 128 an antenna.

In the embodiment, the on-hook operation denotes an operation for the user to seize a speech channel. For instance, it means the operation such that the user hangs up the receiver or inputs the speaker key.

The transfer from the master telephone 14 to the slave telephone 119 will now be described.

The transferring process of the speech control unit 17 of the master telephone 14 in the first embodiment of the invention will be first described with reference to FIGS. 2 to 6.

When the speech control unit 17 receives a transfer key input when the master telephone 14 is busy (step S201), the speech control unit 17 sends a request for a slave telephone call to the radio control unit 16 (S202) and a message indicative of the start of the transfer as shown in FIG. 10D is displayed on the display 19 (S203). The control unit waits for either one of the events such as call success or start (S204) by the radio control unit 16, input of a transfer key (S205), off-hook operation of the master telephone 14 (S206), input of a hold key (S207), and transfer failure or call failure (S208) by the radio control unit 16 in accordance with the request from the speech control unit 17 in step S202.

When the radio control unit 16 has succeeded in connecting the radio line to the slave telephone 119 in step S204 in response to the request in step S202 and the call is started, the speech control unit 17 detects the success of the connection and checks to see if the master telephone 14 is holding the call or not with reference to the memory 129 (S226). When the call is not in holding in step S226, the call is held by sending a holding sound from the audible display 110 to the speech partner through the line interface 111 and switching circuit 118 (S227). A message indicative of in-calling of the slave telephone as shown in FIG. 10B is displayed by the display 19 (S228). It is also possible to send a hold command to the private branch exchange 12, thereby allowing the call to be held therein. The control unit waits for either one of the events such as off-hook of the slave telephone 119 (S229). Carrier off of the slave telephone 119 (S230), off-hook operation of the master telephone 14 or input of the hold key (S231), and input of the transfer key (S232).

When the speech control unit 17 detects the off-hook of the slave telephone 119 through the radio processing circuit 112 in step S229, a check is made to see if the master telephone 14 is in an off-hook state or not (S245). When the master telephone 14 is in the off-hook state at that time, the display 19 is cleared (S246). The switching circuit 118 is controlled and the slave telephone 119 and the master telephone 14 are connected so as to perform a speech communication (S247). When the off-hook of the slave telephone is detected, the control unit 120 of the slave telephone 119 sends a radio signal indicative of the off-hook. The speech control unit 17 discriminates whether the slave telephone 119 is in the off-hook state or not in step S229.

When the on-hook operation of the master telephone 14 is detected (S249) during the speech communication between the master telephone 14 and the slave telephone, the speech control unit 17 controls the switching circuit 118 and connects the holding call through the private branch exchange 12 to the slave telephone 119 so as to execute the speech communication (S250). A message indicating that the slave telephone 119 is in communication as shown in FIG. 10C is displayed by the display 19 (S251) and the transferring process is finished.

When it is recognized in step S245 that the master telephone 14 is in the on-hook state, the processes in step S250 and subsequent steps are executed without connecting the slave telephone 119 and the master unit 14. That is, in the case where the transfer key in the master telephone 14 is depressed and the master telephone 14 is on-hooked in calling of the slave telephone 119, the speech control unit 17 connects the holding call and the slave telephone 119 when the slave telephone 119 is off-hooked.

When the off-hook operation of the master telephone 14 or the input of the hold key is detected in step S231, the speech control unit 17 stops the call by the radio control unit 16 (S242), clears the display 19 (S243), releases the holding (S244), and finishes the transferring process. The above processing routine is executed in the case where the transfer is manually stopped by the operator of the master telephone 14.

When the transfer key input is detected in step S232, the speech control unit 17 stops the calling by the radio control unit 16 (S233) and a check is made to see if the master telephone 14 is in the on-hook state or not (step S234). When it is not in the on-hook state, the display 19 is cleared in order to again set the master telephone 14 into the communicating state (S235). The holding is released (S236) and the transferring process is finished.

When it is detected in step S234 that the master telephone 14 is in the on-hook state, the speech control unit 17 controls the audible display 110 so as to ring a call sound in order to emphasize the presence of the holding call for the master telephone 14 (S237). When the speech control unit 17 detects the on-hook operation of the master telephone 14 or the hold key input (S238), the speech control unit 17 clears the display 19 (S239), stops the call sound (S240), and releases the holding (S241). When the master telephone 14 is again set into the communicating state as mentioned above, the transferring process is finished.

When the transfer by the radio control unit 16 fails in step S208, that is, when the radio lines cannot be connected to the slave telephones 119 in accordance with a predetermined radio procedure, or when the carrier off of the slave telephone 119 is detected by the radio processing circuit 112 in step S230, the speech control unit 17 displays a message by the display 19 in order to inform that the slave telephone could not be called and the transfer has failed (S209). FIG. 10A shows an example of such a display. A point that it is presumed that the power source of the slave telephone 119 is not turned on is also informed to the user as one of the causes of the transfer fault. The speech control unit 17 discriminates whether the master telephone 14 is in the off-hook state or not (S210). When the master telephone 14 is in the off-hook state at this time, a check is made to see if the call is in holding or not by referring to the memory 129 (S211). If it is not in holding, the audible display 110 is controlled to ring a beep sound in order to emphasize the transfer failure while keeping the communicating state (S212). After the elapse of a few seconds, the display of the transfer failure on the display 19 is cleared (S213) and the processing routine is finished.

When the in-holding state is detected in step S211, the speech control unit 17 controls the audible display 110 to send a busy tone (S214). The control unit waits for the events of the hold key input (S215) and the on-hook operation (S216).

When the hold key input is detected in step S215, the speech control unit 17 stops the busy tone (S218), clears the display 19 (S219), releases the holding by the switching circuit 118 and audible display 110 (S220), and again sets the master telephone 14 into the communicating state. The processing routine is finished. In the case where the holding state is set into the private branch exchange 12, a holding release command is sent to the private branch exchange 12, thereby releasing the holding state.

When the on-hook operation is detected in step S216, the busy tone is stopped (S217) and the processes in step S237 and subsequent steps are executed.

On the other hand, when the transfer key input is detected in step S205, a check is made to see if the call is in holding or not (S223). If YES, the processes in step S233 and subsequent steps are executed. When it is detected in step S223 that the call is not in holding, the calling of the slave telephone by the radio control unit 16 is stopped in order to allow the master telephone 14 to perform the speech communication in such a state (S224). The display 19 is cleared (S225) and the transferring process is finished.

When the off-hook operation of the master telephone 14 is detected in step S206, the processes in step S242 and subsequent steps are executed.

When the hold key input is detected in step S207, a check is made to see if the call is in holding or not at that time (S221). If YES, the transfer interrupting processes in step S242 and subsequent steps are executed. If NO, the call is held (S222) and the waiting processes of the events in step S204 and subsequent steps are again executed.

Figure 7:
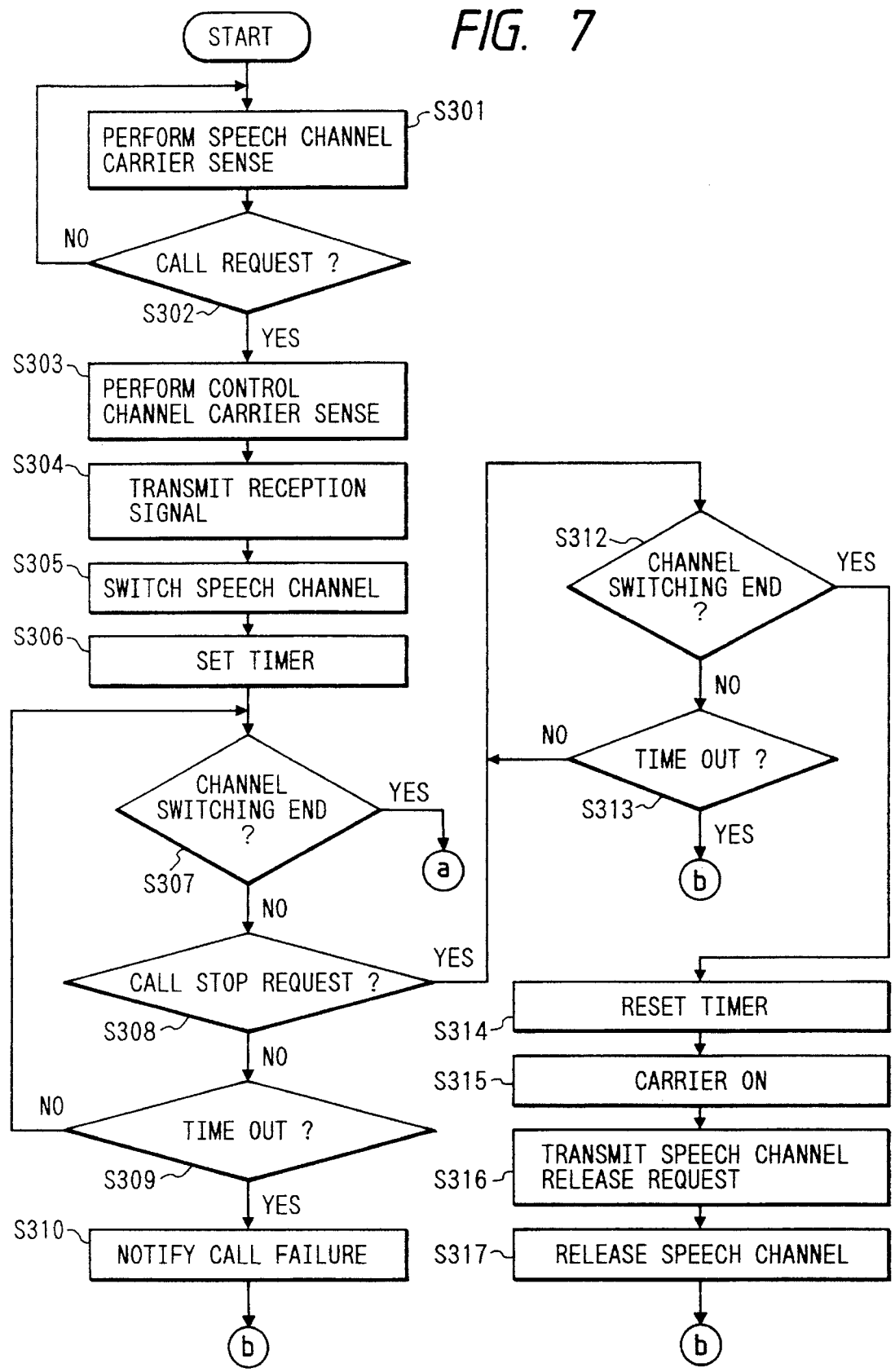
FIG. 7 is a flowchart for the first receiving process of the fixed apparatus of the first embodiment.
Figure 8:
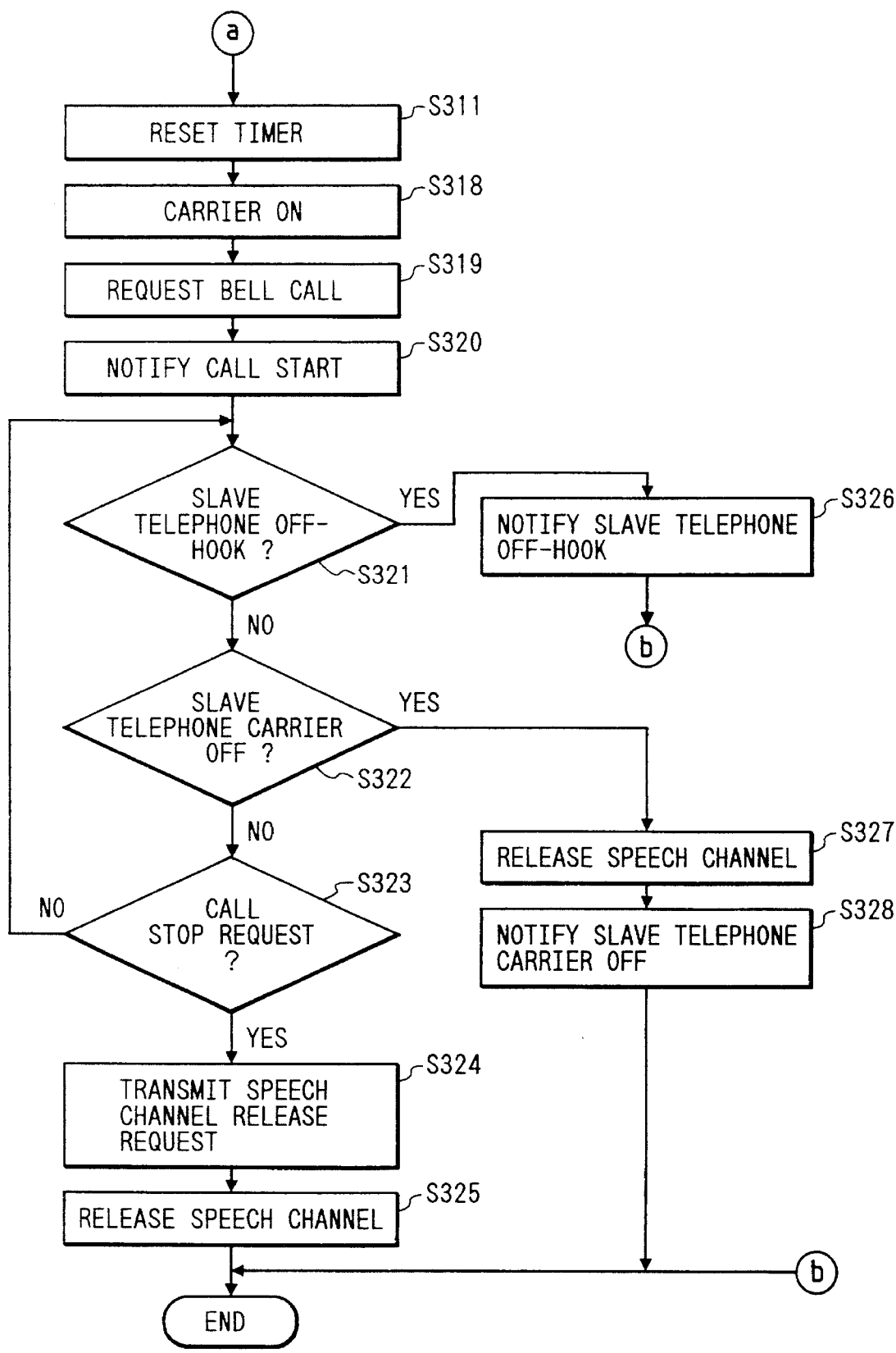
FIG. 8 is a flowchart for the second receiving process of the fixed apparatus of the first embodiment.

Receiving processes of the master telephone radio control unit 16 which are executed in response to the call request in step S202 will now be described with reference to FIGS. 7 and 8 (for the radio control unit 16, the transferring process corresponds to a process for allowing the call to be received by the slave telephone).

While executing the carrier sense of the speech channel by the radio processing circuit 112 (S301), the radio control unit 16 of the master telephone 14 waits for a slave telephone call request (S202) by the speech control unit 117 (S302). When the slave telephone call request is sent, the carrier sense of the control channel is executed by the radio processing circuit 112 (S303). When no carrier exists, a speech channel is designated and a reception signal is transmitted to the slave telephone 119 through the control channel (S304). The channel is switched from the speech channel to the control channel (S305). A timer provided for the memory 129 is set (S306). The radio control unit 16 waits for either one of the events such as reception of a notification of a channel switching end from the slave telephone 119 (S307), call stop request from the speech control unit 17 (S308), and time-out of the timer (S309).

When the notification of the channel switching end is received from the slave telephone 119 by the radio processing circuit 112 in step S307, the radio control unit 16 resets the timer (S311). Further, the radio processing circuit 112 is controlled to turn on the carrier of the speech channel (S318). A bell call request is sent to the slave telephone (S319). The success of the calling of the slave telephone is notified to the speech control unit 17 (S320). The speech control unit 17 detects such a notification in step S204. The control unit waits for either one of the events such as reception of the off-hook of the slave telephone by the radio processing circuit 112 (S321), detection of the carrier off of the slave telephone by the radio processing circuit 112 (S322), and call stop request from the speech control unit 17 (S323).

When the off-hook of the slave telephone 119 is received by the radio processing circuit 112 in step S321, the radio control unit 16 notifies the off-hook of the slave telephone to the speech control unit 17 (S326) and the processing routine is finished. The speech control unit 17 detects such a notification in step S230.

When it is detected in step S322 that the carrier of the slave telephone 119 has been turned off by the radio processing circuit 112, the radio control unit 16 controls the radio processing circuit 112 and releases the speech channel (S327) and notifies the carrier-off of the slave telephone to the speech control unit 17 (S328) and finishes the processing routine. The speech control unit 17 detects such a notification in step S230.

When the call stop request is sent from the speech control unit 17 in step S323, the radio control unit 16 controls the radio processing circuit 112, transmits a speech channel release request to the slave telephone 119 (S324), releases the speech channel (S325), and finishes the processing routine.

When the call stop request is sent from the speech control unit 17 in step S308, the control unit subsequently waits for either one of the events such as reception of the channel switching end from the slave telephone 119 by the radio processing circuit 112 (S312) and the time-out of the timer (S313).

When the radio control unit 16 receives the channel switching end from the slave telephone 119 in step S312, the radio control unit 16 resets the timer (S314). The radio control unit 16 subsequently controls the radio processing circuit 112 to turn on the carrier of the speech channel (S315), transmits the speech channel release request to the slave telephone 119 (S316), releases the communication channel (S317), and finishes the processing routine.

On the other hand, when the time-out of the timer is detected in step S313, the processes are finished as they are.

When the time-out of the timer is detected in step S309, the call failure is notified to the speech control unit 17 (S310) and the processes are finished. The speech control unit 17 detects such a notification in step S208.

Figure 9:
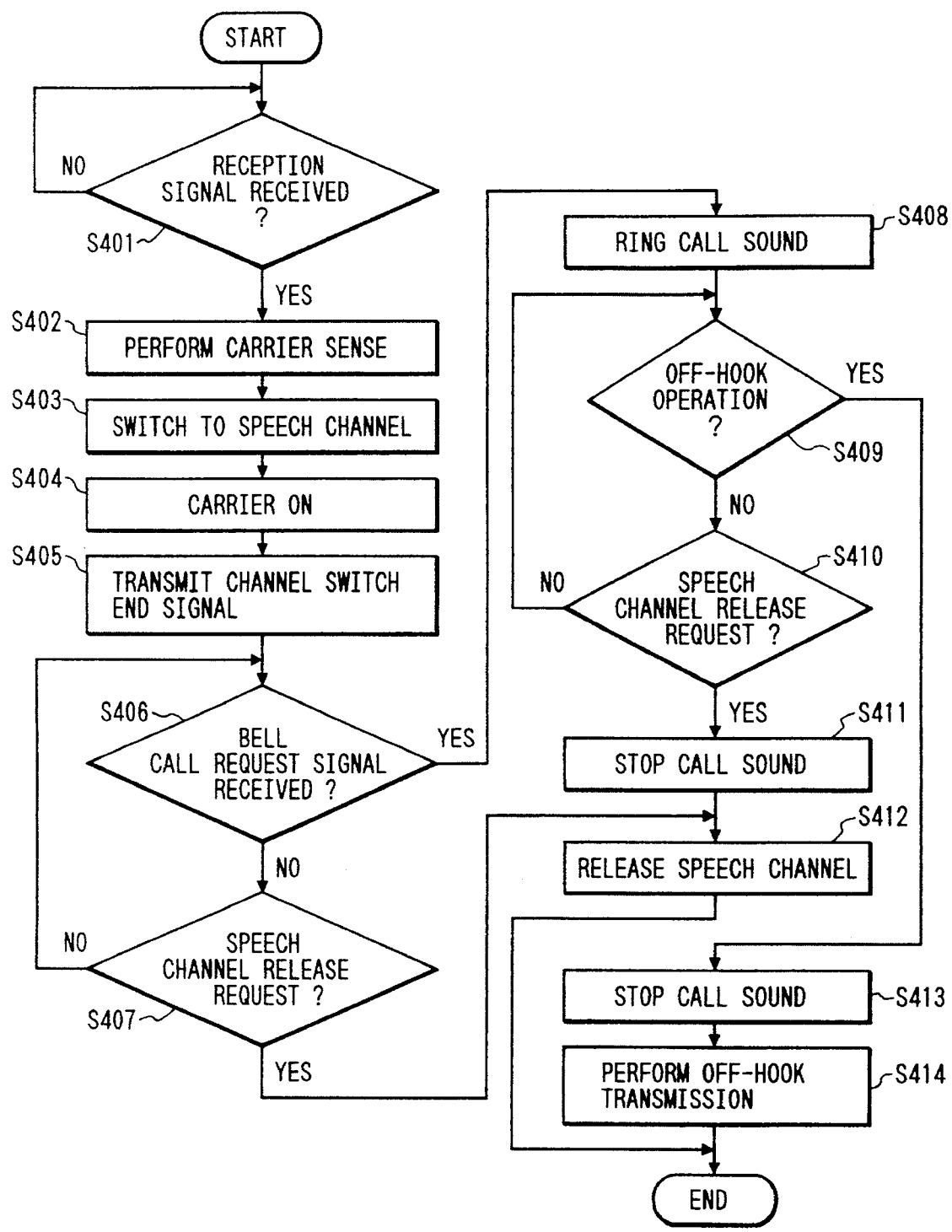
FIG. 9 is a flowchart for the receiving process of the moving apparatus of the first embodiment.

The receiving processes of the slave telephone will now be described with reference to FIG. 9.

When the radio processing circuit 124 receives the reception signal from the master telephone 14 through the control channel (S401), the control unit 120 executes the carrier sense of the channel designated in the reception signal (S402) and switches to the speech channel (S403). The carrier is turned on (S404). The channel switching end is notified to the master telephone 14 (S405). The control unit waits for the event of a bell call request (S406) from the master telephone or a speech channel release request (S407).

When the radio processing circuit 124 receives the bell call request from the master telephone 14 in step S406, the control unit 120 rings the call sound (S408) and waits for the event of the speech key input (S409) or the speech channel release request (S410).

When the speech key input is detected in step S409, the control unit 120 stops the call sound (S413) and notifies the off-hook to the master telephone 14 by the radio processing circuit 124 (S414) and finishes the processes.

When the speech channel release request is sent from the master telephone 14 in step S410, the call sound is stopped (S411), the speech channel is released (S412), and the processes are finished.

When the speech channel release request is sent from the master telephone 14 in step S407, the processes in step S412 and subsequent steps are executed.

In the above embodiment, the fixed apparatus comprises the private branch exchange 12 and the master telephone 14. However, the master telephone 14 can be also constructed in a manner such that an adapter having the function regarding the radio control and the telephone main body portion having the other functions are separately constructed into two different casings and a master telephone is formed by connecting those two casings as necessary.

Figure 11:
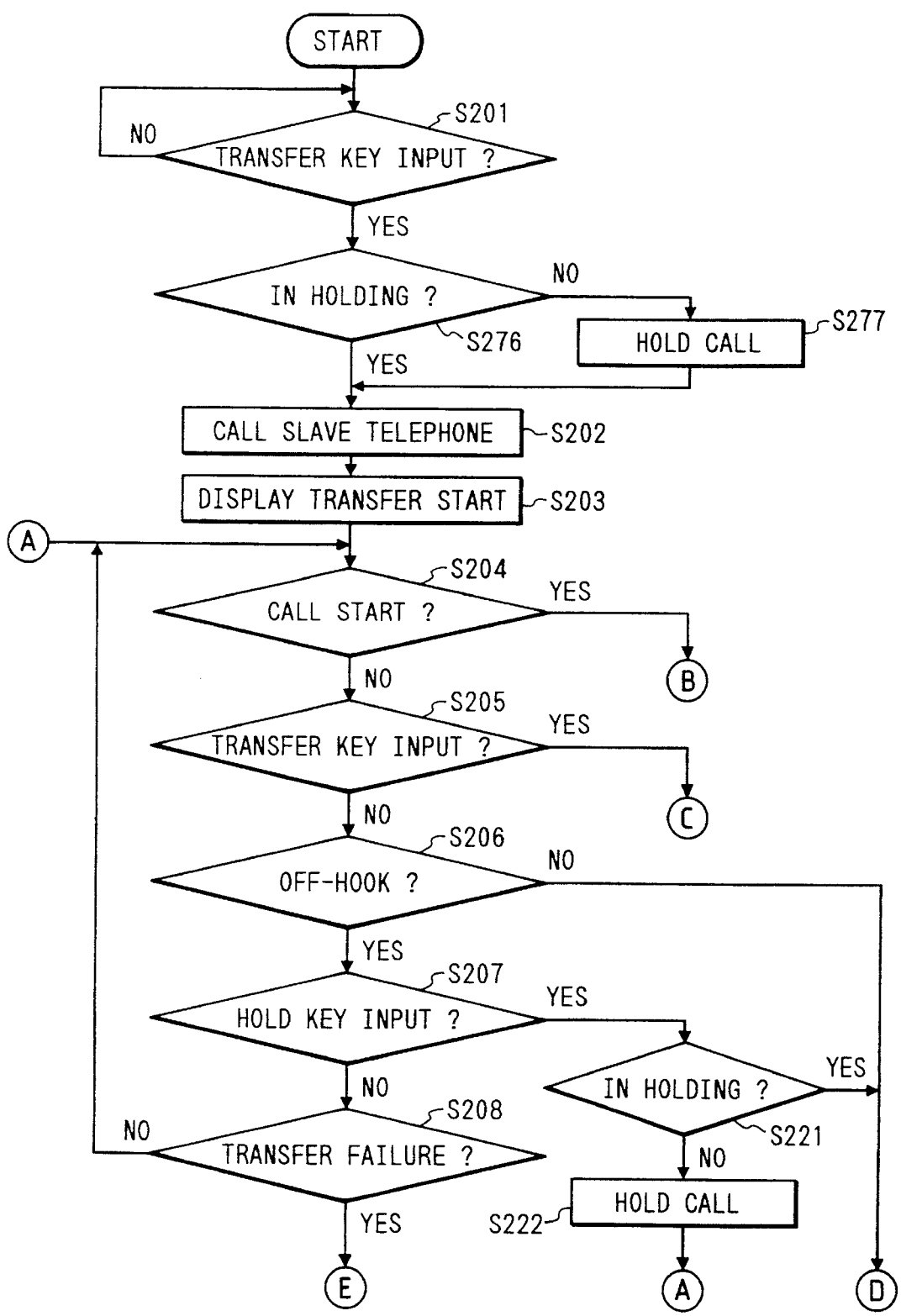
FIG. 11 is a flowchart for the first transferring process of a fixed apparatus of the second embodiment.
Figure 12:
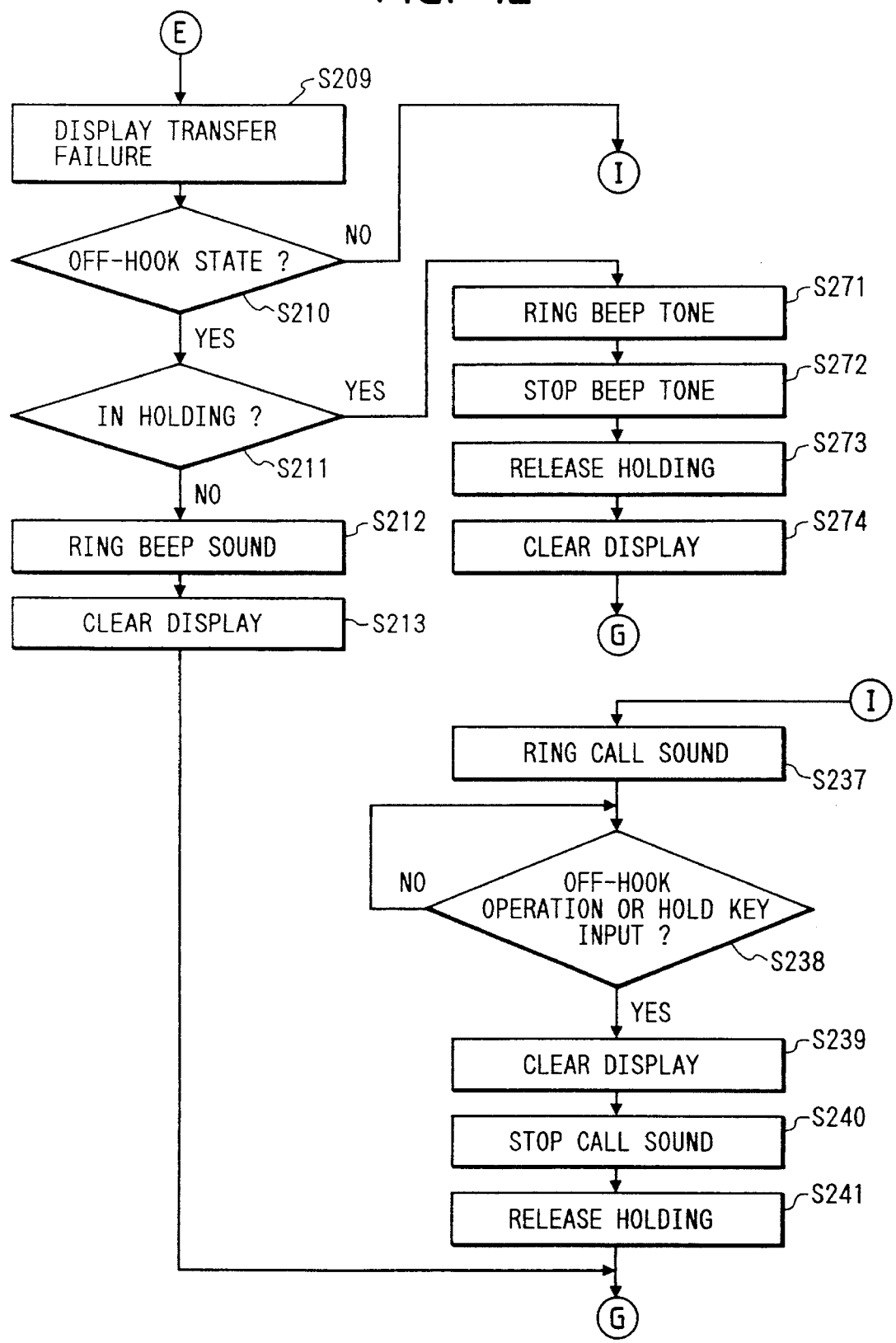
FIG. 12 is a flowchart for the second transferring process of the fixed apparatus of the third embodiment.

The operation of the second embodiment of the invention will now be explained with reference to FIG. 11.

In the transferring processes of the speech control unit 17 of the master telephone 14, the discrimination regarding the in-holding state has been performed between steps S204 and S226 in the first embodiment. However, it is executed in step S276 between steps S201 and S202 in the second embodiment. When the call is not in holding, the call is held (step S277). That is, the hold sound is sent to the speech communication partner through the line interface 111 by controlling the switching circuit 118 and audible display 110. In place of the processes in step S214 and subsequent steps, a beep sound is rung by the master telephone 14 (S271), the beep tone is stopped after the elapse of a few seconds (S272), the holding is released and the master telephone and the call are again set into the speech communicating state (S273), and the display is cleared (S274). In the above case, the processing steps S218 to S220 are unnecessary. With the above method, even if the call is immediately held in response to the request of the transfer start, when the call of the slave telephone fails, the holding state can be released without forcedly executing the operation of the user.

In the third embodiment of the invention, the discriminating step S226 and the process in step S227 are deleted. Or, the holding process of the call (S227) can be also selectively performed by the setting of the memory 129.

In the case where the processes in steps S226 and S227 are deleted, a check is made to see if the call has been held or not before the hold release processes in step S228 and subsequent steps, and when the call has been held, the holding is forcedly released.

In the third embodiment of the invention, a check is made to see if the call is in holding or not between steps S246 and S247. If YES, the processes in step S247 and subsequent steps are performed. On the other hand, when the call is not held or in the case where the holding has forcedly been released as well, when the off-hook of the slave telephone 119 is detected in step S229, the speech control unit 17 allows a beep sound indicating that the speech communication partner will be changed from now on to be generated from the audible display 110 and to be listened to the partner who is talking to the master telephone 14. After that, the call is connected to the slave telephone 119. A beep sound is also rung by the master telephone 14, a message indicating that the slave telephone is busy is displayed, and a busy sound is sent. After that, when the master telephone 14 executes the on-hook operation, the transferring process is finished. Therefore, when the call is transferred from the master telephone 14 to the slave telephone 119, it can be transferred without passing through the holding process of the call. When the transfer call is connected to the slave telephone 119, a messge indicating that the communication partner will be changed from now on for the master telephone 14 and the call can be displayed.

Figure 13:
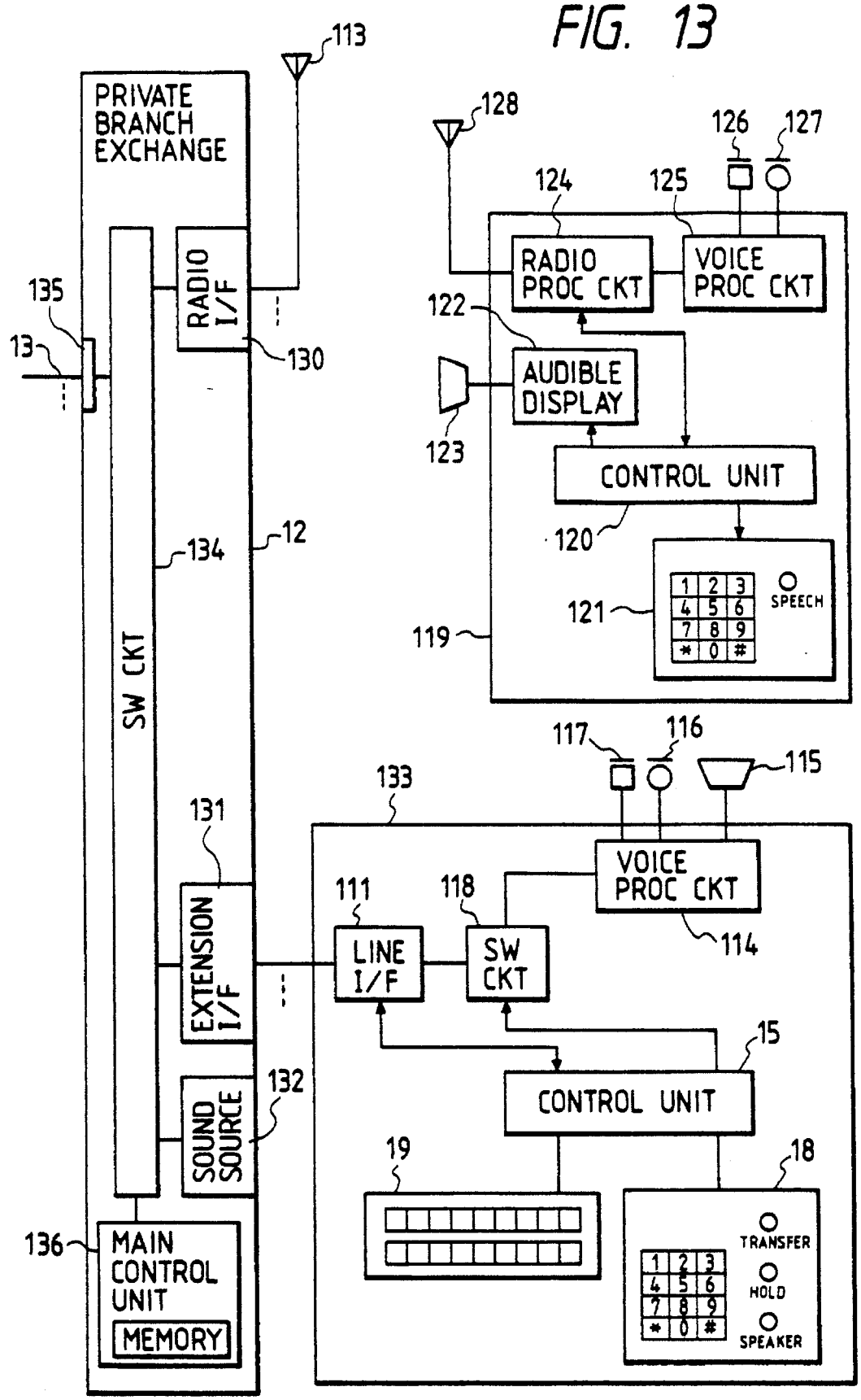
FIG. 13 is a system constructional diagram of the fourth embodiment.

In the above embodiment, the fixed apparatus comprises the private branch exchange 12 and the master telephone 14. As shown in FIG. 13, however, the private branch exchange 12 and the master telephone 14 can be also integratedly constructed as a radio interface 130.

In such a case, a main control unit 136 of the private branch exchange 12 detects a transfer request to the cordless telephone 119 by an extension telephone 133 through an extension interface 131, the radio interface 130 is controlled, and the slave telephone 119 is called.

While the extension telephone 133 is communicating with another extension telephone or the cordless telephone 119 or an external line, the transfer request can be also transferred to another extension telephone line or external line.

Figure 14:
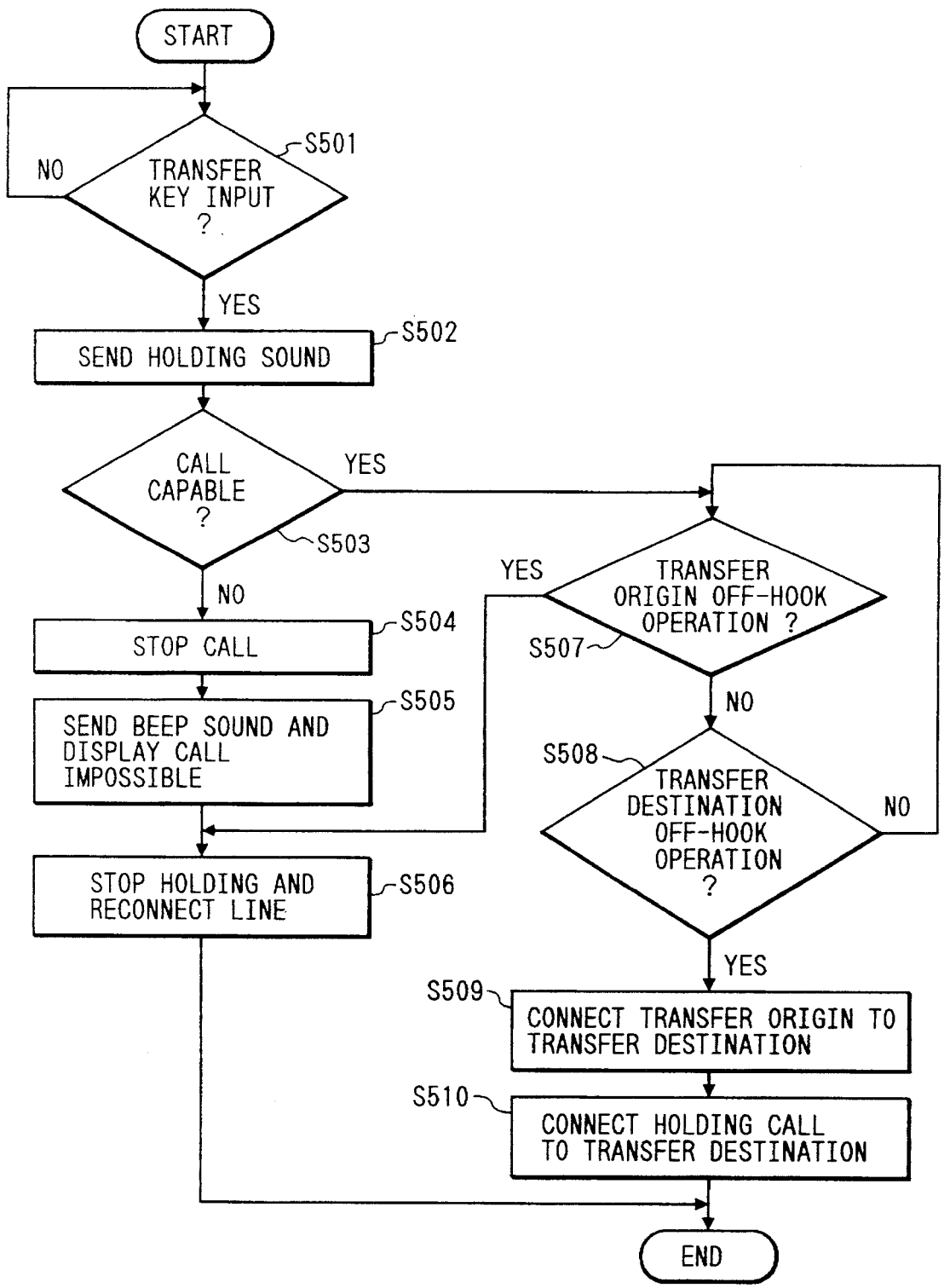
FIG. 14 is a flowchart for the transferring process of the fourth embodiment.

The operation of the above embodiment is shown in FIG. 14.

When the transfer key of the extension telephone 133 is depressed during the speech communication (S501), the control unit 15 of the extension telephone 133 transmits a transfer key depression code onto the control channel by the line interface 111 and sends to the extension interface 131 of the private branch exchange 12. The dial number to designate a transfer destination is also similarly sent as a ten-key depression code.

The main control unit 136 of the private branch exchange 12 receives the transfer key depression code and the ten-key depression code through the extension interface 131 and a switching circuit 134, analyzes them, controls the switching circuit 134, connects the communication partner of the extension telephone 133 in which the transfer key has been depressed to a sound source 132, and sends a hold sound (step S502). An extension or an external line specified by the ten-key depression code is discriminated and a check is made to see if the extension or external line can be called or not (step S503). If NO, the main control unit 136 stops the call (step S504). Further, a control command is sent through the switching circuit 134 and extension interface 131, a beep sound is sent to the extension telephone 133, and a message indicating that the extension or external line cannot be called is displayed by the display 19 (step S505).

As a case where it is impossible to call, there are considered a case where the extension number which is specified by the depressed ten-key inherently doesn't exist, a case where the extension telephone is out of order and no response command is returned even when a call command is sent, a case in speech communication, and the like. Even in the case in speech communication, it is determined that the extension or external line can be called so long as it is possible to call in communication. In the case of the external line, the busy tone or ring back tone is detected by an external line interface 135. When the ring back tone cannot be detected, it is decided that the call is impossible. It is also possible to set such that the discrimination in step S503 is not performed in the case of the external line transfer.

In the case of transferring to the cordless telephone 119, the main control unit 136 controls the radio interface 130 and calls the cordless telephone 119. When the response from the cordless telephone 119 cannot be detected, the radio interface 130 notifies the call failure to the main control unit 136 through the switching circuit 134. In such a case, the main control unit 136 determines that the call is impossible.

In step S506, the main control unit 136 releases the holding and again connects the line. That is, the main control unit 136 controls the switching circuit 134 and the transfer call connected to the sound source 132 is again connected to the extension telephone 133.

When it is determined in step S503 that the call can be performed, the main control unit 136 calls the transfer destination and waits for the off-hook operation (step S507) of the telephone which has performed the transfer operation or the off-hook operatin (step S508) of the transfer destination. When the main control unit 136 detects the off-hook operation of the transfer origin through the extension interface 131 in step S507, the holding is stopped and the line is again connected (step S506).

When the off-hook of the transfer destination is similarly detected in step S508, the main control unit 136 controls the switching circuit 134 and connects the extension telephone 133 which has performed the transfer operation to the person who has called (step S509). When the transfer request person off-hooks after a message indicating that he transfers information to a response person on the transfer destination side was informed to the response person by the telephone, the main control unit 136 controls the switch 134 and connects the call held in step S502 to the transfer destination (step S510).

In the case where the transfer origin is in the off-hook state when the off-hook of the transfer destination was detected in step S508, the holding call is connected to the transfer destination without connecting the transfer origin to the transfer destination.

In the case where the transfer destination is a facsimile when the extension telephone 133 responded to the external line reception, the same shall also apply to the case of transferring to one (including a cordless facsimile) among a plurality of facsimile apparatuses enclosed in the extensions.

On the other hand, in the case where the operator has erroneously inputted the telephone number of the facsimile apparatus when he intends to transfer to the telephone, a facsimile procedure signal which is sent from the facsimile which has responded is detected by the extension interface and the processes in step S505 and subsequent steps are executed.

Although the case where the transfer is requested by the extension telephone 133 has been described above, in the case where the transfer is requested from the cordless telephone 119, the main control unit 136 detects the transfer request through the antenna 113, radio interface 130, and switching circuit 134. By using the above method, it is also possible to similarly control in the case of transferring from the cordless telephone 119 to another cordless telephone or extension telephone external line.

Since the main control unit 136 can discriminate the reason why the call is impossible in step S503, a fact that the call cannot be performed to the extension telephone which has requested the transfer and its reasons are displayed in step S504. That is, in the case where the extension number designated from the extension telephone which has requested the transfer doesn't exist, in other words, in the case where such an extension number is not registered in an internal memory, a message to inform the erroneous input of the extension number is displayed. On the other hand, when a response to the call command is not returned due to the reason such as failure, disconnection, or the like, a message to inform that the transfer destination is out of order is displayed. In the case where the transfer destination is busy, a message to inform that the transfer destination is busy is displayed. When the radio line cannot be connected in the case of calling the cordless telephone, a message indicative of such a fact is displayed.

The transfer request person looks at the display content and again inputs the correct number in the case of an erroneous input or inputs another extension number in the case where the called extension is busy. When the extension is out of order, the repair can be requested later.

Although the case of transfer has been described above, even in the case of the ordinary call instead of the transfer, the reason why the call is impossible can be also similarly displayed.

Although the invention has been described above on the basis of the preferred embodiments, the invention is not limited to the foregoing embodiments but many modifications and variations are possible within the spirit and scope of the appended claims of the invention.

What is claimed is:

1. A connection switching apparatus comprising:

connecting means for selectively connecting a first station to one of a second station, a third station and a holding tone source;

detecting means for detecting a request from the second station;

calling means for calling the third station in response to the request from the second station when the first station and the second station are connected by said connecting means;

discriminating means for discriminating whether or not the third station which has been called by said calling means, can respond to a call by said calling means; and control means for controlling said connecting means such that the first station which has been connected to the second station, is connected to the holding tone source when it is discriminated by said discriminating means that the third station can respond to the call, wherein said connecting means connects the first station, which has been connected to the holding tone source, to the third station when the third station responds to the calling means.

2. An apparatus according to claim 1, wherein said control means controls said connection means such that the first station and the holding tone source are connected when it is discriminated by said discriminating means that a communication channel between the second station and the third station is connected.

3. An apparatus according to claim 1, wherein said discriminating means comprises receiving means for receiving from the third station a response signal representing a response to the call.

4. An apparatus according to claim 1, wherein said connecting means connects the first station and the third station when the third station responds to the call.

5. A connection switching apparatus comprising:

connecting means for selectively connecting a first station to one of a second station, a third station and a holding tone source;

sending means for sending a calling signal to the third station when the first station and the holding tone source are connected by said connecting means in response to a request of the second station;

receiving means for receiving from the third station a response signal representing a response to the calling signal; and control means for controlling said connecting means such that the first station, which has been connected to the holding tone source, is connected to the second station when the response signal is not received in a predetermined period by said receiving means, wherein said connecting means connects the first station, which has been connected to the holding tone source, to the third station after the response signal is received by said receiving means.

6. An apparatus according to claim 5, wherein said sending means sends the calling signal through a control channel.

7. An apparatus according to claim 5, wherein the response signal includes a switch signal representing that a communication is performed through a speech communication channel.

8. An apparatus according to claim 5, wherein said connecting means connects the first station and the third station when the third station responds to the calling signal.

9. An apparatus according to claim 5, wherein the first station and the second station are connected without any manual instruction.

10. A connection switching method for selectively connecting a first station to one of a second station, a third station and a holding tone source, the method comprising the steps of:

detecting a request from the second station;

calling the third station in response to the request from the second station when the first station and the second station are connected;

discriminating whether or not the third station, which has been called in said calling step, can respond to a call in said calling step; and connecting the first station, which has been connected to the second station, to the holding tone source when it is discriminated in said discriminating step that the third station can respond to the call, wherein the first station, which has been connected to the holding tone source in the connecting step, is connected to the third station when the third station responds to the call.

11. A method according to claim 10, wherein the first station and the holding tone source are connected when it is discriminated in said discriminating step that a communication channel between the second station and the third station is connected.

12. A method according to claim 10, wherein said discriminating step comprises a receiving step of receiving from the third station a response signal representing a response to the call.

13. A method according to claim 10, wherein the first station and the third station are connected when the third station responds to the call.

14. A connection switching method for selectively connecting a first station to one of a second station, a third station and a holding tone source, the method comprising the steps of:

sending a calling signal to the third station when the first station and the holding tone source are connected in response to a request of the second station;

receiving from the third station a response signal representing a response to the calling signal; and connecting, without any manual instruction, the first station, which has been connected to the holding tone source, to the second station when the response signal is not received in a predetermined period in said receiving step, wherein the first station, which has been connected to the holding tone source in said connecting step, is connected to the third station after the response signal is received in said receiving step.

15. A method according to claim 14, wherein in said sending step the calling signal is sent through a control channel.

16. A method according to claim 14, wherein the response signal includes a switch signal representing that a communication is performed through a speech communication channel.

17. A method according to claim 14, wherein the first station and the third station are connected when the third station responds to the calling signal.

* * * * *